United States Patent [19]
Roy

[11] 3,839,202
[45] Oct. 1, 1974

[54] FLOCCULANT PRODUCT

[76] Inventor: Clarence H. Roy, Oak Ridge Dr., Bethany, Conn.

[22] Filed: Sept. 7, 1973

[21] Appl. No.: 395,283

[52] U.S. Cl. ........ 210/54, 260/17.4 SG, 260/89.7 S
[51] Int. Cl. ............................................ B01d 21/01
[58] Field of Search ....... 210/54, 282; 260/17.4 SG, 260/89.7 S

[56] References Cited
UNITED STATES PATENTS

| | | | |
|---|---|---|---|
| 2,369,057 | 2/1945 | Leary et al. | 260/17.4 SG |
| 3,324,180 | 6/1967 | Beer et al. | 260/89.7 S |
| 3,412,060 | 11/1968 | Sarem | 260/89.7 S |
| 3,474,055 | 10/1969 | Dooley | 260/17.4 SG |

*Primary Examiner*—Samih N. Zaharna
*Assistant Examiner*—Peter A. Hruskoci
*Attorney, Agent, or Firm*—DeLio and Montgomery

[57] ABSTRACT

Aqueous systems such as municipal and industrial effluents and process waters, swimming pools, and potable water supplies are clarified by immersing in the system a flocculant product comprising a high molecular weight, water soluble, synthetic organic polyelectrolyte flocculating material which has been treated with a water soluble, organic polyhydroxy compound so as to convert the polyelectrolyte material to a rubbery, self-supporting mass. The flocculant product can be produced in dosage unit form in accordance with the amount of flocculating material required for treatment of an aqueous system. A support member such as a meshwork envelope may be used to support the flocculant product in the aqueous system. Typical polyhydroxy compounds are glycerine, ethylene glycol, propylene glycol, sorbitol and sucrose.

21 Claims, 3 Drawing Figures

PATENTED OCT 1 1974 3,839,202

FLOCCULANT PRODUCT

BACKGROUND OF THE INVENTION

This invention relates to a flocculant product useful for clarifying aqueous systems such as municipal and industrial effluents and process waters, swimming pools, potable water supplies, and the like. The invention includes a flocculant product, the combination of the flocculant product with a support member, a process for clarifying an aqueous system utilizing the flocculant product or combination, and a process for preparing the flocculant product.

High molecular weight, water soluble, synthetic organic polyelectrolyte flocculating materials are widely used for treating aqueous systems to improve clarity by assisting in the separating out of suspended particles. These polyelectrolyte flocculating materials generally are polymers of amino or acrylic monomers and have molecular weights of at least 100,000 but more generally of the order of 1,000,000 or higher.

The polymers can be anionic, cationic, or nonionic, the choice of molecular weight, charge, charge distribution, and structural characteristics of the polymer being dependent upon the nature of the aqueous system to be treated. Since most naturally occurring suspended material in municipal, industrial and domestic water systems has a negative charge, the cationic polyelectrolyte flocculating materials will be used. However, some specific industrial systems or wastes have a net positive charge and must be treated with anionic polyelectrolyte flocculating materials. For example, industrial effluent streams containing metal oxides are more effectively clarified by use of anionic flocculating materials. The nonionic polymeric flocculating materials are used where the need to neutralize a charge on the suspended material is not significant, as in the case of clarification of ground waters.

The polyelectrolyte flocculating materials are sold under various brand names such as "Magnifloc", "Percol", "Aquafloc", "Purifloc", "Cat-Floc", "Decolyte", "Separan", "Natron" and "Drewfloc".

As used in this specification the term "flocculating" or like term is used in a non-limiting and broad sense to mean a material which coagulates suspended particulate material in an aqueous system, which serves as a flocculating or filtration aid in the removal of suspended particulate material, which operates as a sludge conditioning agent, or which reduces friction in turbulent flow systems. The term "clarifying" or like term is also used in a broad and non-limiting sense to describe the improved condition of the aqueous system due to treatment with the flocculant product of the invention.

A common problem in the use of polymeric polyelectrolyte flocculating materials is the difficulty with which the materials disperse and dissolve in an aqueous system. The problem is overcome somewhat when the flocculating material is provided in liquid form. However, the liquid form requires an additional processing step since the flocculating materials are normally synthesized and precipitated as powders or particulate solids. In the case of the powders or particulate solids, it is necessary first to form a liquid concentrate by mixing the solid carefully with a liquid. In any case the material must be dissolved or dispersed slowly and continuously by the use of mechanical mixing devices and low shear pumps in order to avoid lumping together of the particulate solids or the formation of gummy masses. Such lumps or masses impede flow and lessen the clarifying power of the material.

In addition to the problem of careful dispersion in an aqueous system, the dosage rate of the flocculating material in liquid concentrate form in the system must be carefully controlled. It is known that excessive amounts of flocculating materials can produce lower settling rates, poorer flocculation, poorer clarity, and generally lower efficiency in the treatment. It is therefore necessary to estimate dosage rates from laboratory tests, to carefully disperse the material in the aqueous system, and to employ metering devices for feeding the material into the aqueous system to be treated.

The foregoing dispersion and dosage rate control problems when not fully solved often lead to interruptions and increased maintenance costs. Still further, more stringent environmental protection standards require improved settling characteristics, including the removal of "pin floc", the very finely divided particles that often fail to settle out in the usual treatment.

Objects and Summary

Accordingly, an object of the invention is to provide an new and improved flocculant product which largely eliminates the need for careful mechanical dispersion of the flocculating material in an aqueous system to be clarified.

Still another object is to provide a new and improved flocculant product which eliminates the need for pumps and other devices for regulation of dosage rates of the flocculating material in an aqueous system.

A further object is to provide a new and improved flocculant product in a form which will permit simple and highly efficient control of dosage rate in any aqueous system to be treated, whether industrial, municipal or domestic water supplies, including potable water and swimming pools.

Still another object is to provide a new and improved flocculant product which can be conveniently stored for emergency use when conventional flocculating treatments break down or when additional clarification capability is required.

Other objects include the provision of means for fixing the position of the flocculating material in an aqueous system, a process for clarifying aqueous systems in a simple and economical manner, and an efficient and economical process for preparing flocculant products of the invention.

In summary outline, the foregoing and other objects of the invention are achieved by treating a high molecular weight, water soluble, synthetic organic polyelectrolyte flocculating material with a water soluble, organic polyhydroxy compound so as to convert the polyelectrolyte material to a rubbery, self-supporting mass. By compounding the flocculating material and the polyhydroxy compound in a suitable mold, the mass may be shaped and dimensioned to unit dosage form so that the dosage rate of the flocculating material in any given aqueous system may be controlled simply by immersing the required number of unit flocculant products in the system. The compounded rubbery mass of flocculating material and polyhydroxy compound may be cylindrical, polygonal, or have any other shape, regular or irregular, suitable for unit dosage form.

The flocculant product may be immersed or suspended in an aqueous system in any suitable manner but preferably it is encapsulated in a water permeable envelope so that its position may be fixed in the system at points where clarification is most useful, and so that large portions of the flocculating material are not lost before they become operative in clarification. In some aqueous systems the flocculant product may be utilized without an auxiliary supporting member, for example, in the flocculant cake cage normally in the return flow lines in swimming pool pumping systems.

The self-supporting, rubbery mass form of the flocculant product permits the flocculating material to be readily handled, stored, and transported as well as used to satisfy the dosage rate requirements in any given system. The rubbery mass form of the flocculant product also avoids the need for dispersion equipment and dosage rate metering equipment at point of use, and satisfies the need for a simple and economical flocculant product which can be utilized by relatively unskilled personnel without such equipment under any circumstance, including emergency situations when an existing, continuous flocculating treatment has broken down. Additionally, the form of the flocculant product permits immediate, additional flocculating capacity when the need arises.

While not fully understood it is believed that the flocculant product of the invention provides controlled rate of dissolution of the flocculating material as a result of the coating of flocculating material particles with the water soluble, polyhydroxy compound. When the product is immersed in an aqueous system the water first begins to dissolve the polyhydroxy compound "glue" and thereafter the flocculating material. Dissolution and dispersion of the flocculating material is therefore controlled and its otherwise usual tendency to clump or to form a gummy mass is avoided.

These and other objects, features and advantages of the invention will be apparent from the specification which follows.

DETAILED DESCRIPTION

For a fuller understanding of the nature and objects of the invention, reference is had to the following description taken in conjunction with the accompanying drawing, in which.

Figure 1:
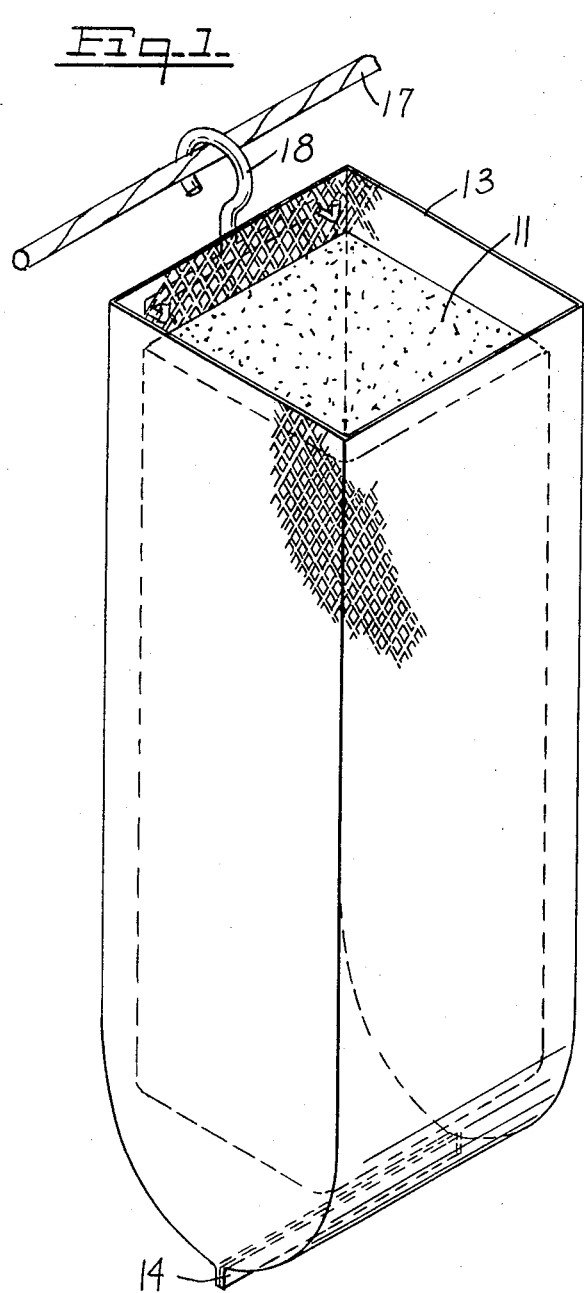
FIG. 1 is a partly diagrammatic, perspective view of an embodiment of the invention.
Figure 2:
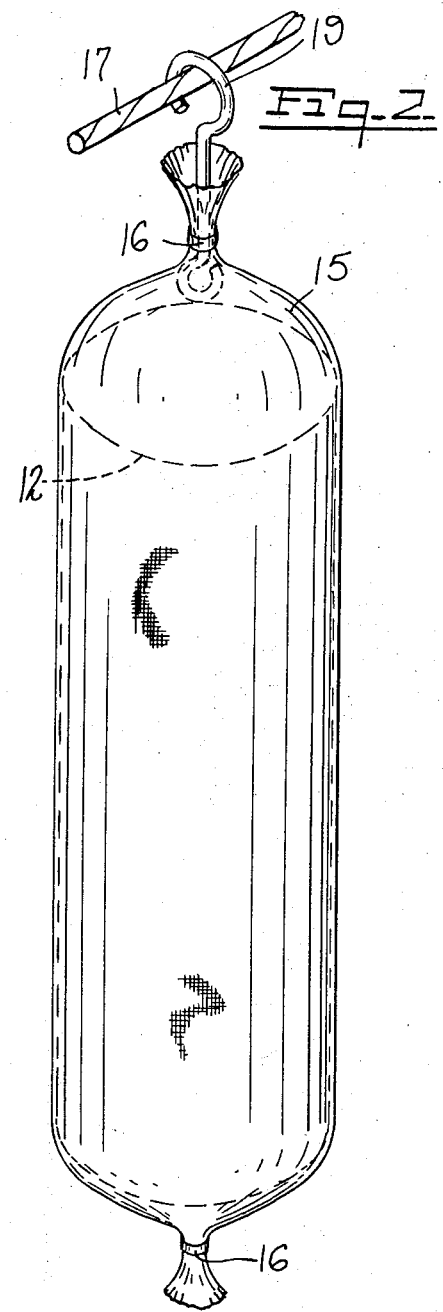
FIG. 2 is a partly schematic perspective view of another embodiment of the invention.

With respect to the drawing, the flocculant product of the invention may take any shape suiting the convenience of the user and for incorporation of the appropriate quantity of flocculating material for the dosage rate requirements of an aqueous system to be treated. The flocculant product therefore may have a rectangular and elongated shape such as the flocculant product 11 in FIG. 1, or an elongated, solid, cylindrical shape such as cylinder 12 of FIG. 2. Generally, the flocculant product will be solid throughout but for some applications it may be hollow or have ports therethrough, or other irregularity or departure from standard geometrical forms. As a generally solid body the flocculant product may take the form of a bar, billet, cartridge, cake, or the like. Such forms are easily fashioned by use of molds, extrusion devices, or the like, as described further below.

Figure 3:
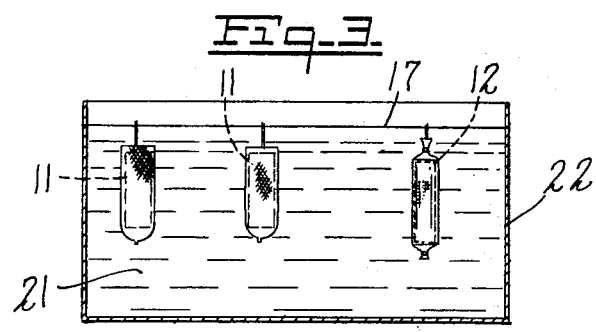
FIG. 3 is a side view illustrating one mode of use of flocculant products of the invention in an aqueous system.

The flocculant product of the invention may be immersed in an aqueous system requiring treatment in any suitable way such as by suspending it or by merely dropping it into the system. However, in one mode of use as shown in FIG. 3, the flocculant product in a rectangular bar form 11 may be encased in a meshwork envelope such as a relatively permanent polyethylene mesh container 13 having an open top and a bottom which may be heat sealed to form a closure seam 14. The relatively permanent polyethylene mesh container 13 is useful in aqueous systems having a fixed treatment point and where it is convenient to suspend or mount the container fixedly at the position. The container then may be replenished with flocculant product units as they are consumed. In aqueous systems where the point of treatment may not be fixed or where the use of a completely disposable flocculating device is desirable, the flocculant product may be enveloped in a throw-away plastic or fibrous material such as a "sock" 15. The container 15 in this disposable form may also be closed or open at its top end but in one form it is convenient to provide metal clamps 16 as the top and bottom in the manner of sausage manufacture.

As illustrated in FIG. 3 it is convenient to suspend the flocculant product units from a line 17 over the aqueous system to be treated, by clamps or by other coupling means such as hooks 18 and 19. By such supporting means the flocculant product, as shown in FIG. 3, may be supported singly or in multiples of flocculant product units in an aqueous system 21 requiring treatment. The aqueous system may be contained in a relatively limited enclosure such as a tank 22, as in municipal and industrial water treatment systems, or in a pipeline or other conduit such as a river stream, duct, and the like.

The dosage rate of flocculating material in the aqueous system may be easily and precisely controlled merely by shaping and dimensioning the flocculant product and by controlling the relative proportions of flocculating material and polyhydroxy compound in the flocculant product. As will become evident from the description following, such proportions largely control the rate of dissolution of the flocculating material in the aqueous system.

It will be evident from the description of the invention to this point that the flocculant product provides a sure and easy approach to water clarification since the flocculant products may be used without expensive dispersing and dosing apparatus, and since the flocculant products may be conveniently transported and stored for use at any time.

The primary ingredient of the flocculant product is a high molecular weight, water soluble, synthetic organic polyelectrolyte flocculating material. A great variety of such materials are commercially available. Generally, they are polymers or copolymers of amino or acrylic monomers, such as polymers of acrylamide and acrylamide derivatives such as partially hydrolyzed acrylamide, copolymers of acrylamide or its N-substituted derivatives with other monomers, and polymers of ethylene imine and the like. The polyelectrolyte polymers may be anionic, cationic, or nonionic. The polymers may be used alone as the flocculating material or in admixture with other flocculating aids such as iron salts, alum, lime, and the like. In preparing the flocculant product it is preferred to use the polyelectrolyte polymers in their more usual solid, particulate form. Liquid forms can be used in preparing the flocculant products of the invention by first precipitating the polymeric material and isolating it in a particulate form, or by admixing the liquid form with a solid, particulate form.

For use in most aqueous systems the polymeric polyelectrolyte materials should be substantially pharmacalogically inert and devoid of toxicity to mammals including humans to the extent required by state and federal regulations. The polyacrylamide and other polyelectrolytes are available in various grades for use in virtually any aqueous system, including potable water.

For most applications the polyhydroxy compound with which the polyelectrolyte flocculating material is treated to form a rubbery self-supporting mass, should also be pharmacalogically inert and non-toxic to mammals including humans, to the same extent as required of the flocculating materials. It has been found that a wide variety of organic polyhydroxy compounds have the requisite inertness, water solubility and ability to cause the polyelectrolyte material to set up to a rubbery, self-supporting state. Monohydroxy compounds, wherein the hydroxy substituent is the only functional substituent or where other functional substituents are present in the molecule, are generally ineffective for the purposes of preparing the flocculant products of the invention. For example, the monohydroxy alcohols, alcohol ethers, oxides and alkanol amines appear to be ineffective to the extent required for useful products. Even in those instances where they impart some rubbery, self-supporting character to the polyelectrolyte material, the resulting product acquires undesirable properties such as an unacceptable level of toxicity.

Most of the polyhydroxy organic compounds found effective to date are liquids at ambient temperatures but there are exceptions, such as many of the monosaccharides and polysaccharides. In such cases the polyhydroxy compound, if the polyelectrolyte material is not a liquid, is made liquid by dispersing or dissolving the polyhydroxy compound in a minor amount of solvent which will not otherwise detract from the requisite properties of the flocculant product produced. For example, sucrose may be dissolved in a small amount of water and the polyelectrolyte material added to the resulting solution with sufficient agitation for good contact between the ingredients. Excessive amounts of solvent, especially water, should be avoided due to the tendency of such solvents to form gummy deposits with many flocculating materials.

Among the wide variety of water soluble, polyhydroxy organic compounds useful in preparing the flocculant products of the invention may be mentioned alkane polyols containing 2–6 carbon atoms and 2–6 hydroxyl groups, such as diols, triols, and polyols containing over three hydroxyl groups. The alkane polyols include diols such as ethylene glycol, diethylene glycol, trimethylene glycol, triethylene glycol, propylene glycol, and dipropylene glycol; triols such as glycerine; tetritols such as erythritol and pentaerythritol; pentahydrics such as adonitol, arabitol and xylitol; and hexahydrics such as sorbitol, mannitol, and the like. Other polyols include the monosaccharides such as glucose and fructose, polysaccharides including the disaccharides such as sucrose, polyglycerol esters such as diglycerol, triglycerol, hexaglycerol and decaglycerol, and mixed polyols derived from sorbitol commercially available under the brand name "Sutro".

The amount of polyhydroxy organic compound required to convert the polyelectrolyte material to a rubbery self-supporting mass may vary widely, for example, from about 0.01 percent to about 50 percent based on the combined weight of polyhydroxy compound and polyelectrolyte material. The optimum proportions depend upon the type of polyelectrolyte material and polyhydroxy compound and can be determined quickly and readily by routine experiment since a useful, rubbery self-supporting mass usually forms quickly. In the case of the more complex polyhydroxy compounds and admixtures, such as the "Sutro" sorbitol derivatives, the set time will be of the order of about 0.5 to about 2 minutes, but for glycerine and ethylene glycol about 5 to 10 minutes, and for sucrose and propylene glycol about 20 to 30 minutes. If too much of the polyhydroxy compound is used, the product will tend to be gelatinous, flowable, and therefore not self-supporting. An excessive amount of polyhydroxy compound, even if the product is rubbery and self-supporting, causes the product to be soft and sticky to the touch and therefore not as easily packaged, transported and stored as products containing lower amounts of polyhydroxy compound. In general, the amount of polyhydroxy compound should be enough to uniformly coat the polyelectrolyte material if the material is granular and the upper limit will be dictated by cost and the extent to which the product must be handled for effective use.

The amount of polyhydroxy compound has no effect on the flocculating properties of the flocculating material in the product except to the extent that an excessive amount of polyhydroxy compound will cause the flocculating material to dissolve and disperse too rapidly, or too little polyhydroxy compound will prevent the product from becoming self-supporting. Such deficiencies of course will detract from precise dosage rate control in a given aqueous system and affect the rate of dissolution of flocculating material from the product in an aqueous system. Provided the flocculating material is rendered self-supporting by the polyhydroxy compound, the total amount of flocculating material and the proportion of polyhydroxy compound will therefore be selected for optimum rate of dissolution of flocculating material in a given system and in accordance with the dosage rate requirements of the system. Such requirements either are already known for an aqueous system to be treated or can be determined in a routine manner.

The flocculant products of the invention are prepared by mixing the polyelectrolyte material and the polyhydroxy compound in a liquid medium with sufficient agitation to obtain good admixture and to uniformly coat the granules with the polyhydroxy compound. The polyhydroxy compounds may be used singly or in admixture of two or more and it is preferred to add the polyelectrolyte material, when in a particulate state, to the polyhydroxy compound when the latter is a liquid. Of course, when both the polyelectrolyte material and the polyhydroxy compound are solids, one or the other, preferably the polyhydroxy compound, must be dissolved in a suitable solvent to provide the liquid medium for admixing. A small amount of water or other mutual solvent is useful for this purpose but large quantities of water should be avoided since water will tend to cause the polyelectrolyte material to form gummy masses which then cannot be converted adequately into self-supporting rubbery products. It may also be useful to add minor amounts of surface active agents to assist in the uniform admixing of polyelectrolyte material and polyhydroxy compound, such as the fluorocarbon surfactants set forth in U.S. Pat. Nos. 2,567,011 and 2,937,098. Such fluorocarbon surfactants are sold by 3M Company under the brand names FC-95, FC-98, FC-170 and FC-128.

The polyelectrolyte material and polyhydroxy compound may be admixed in a suitable mold, or after admixing the mixture may be transferred to a mold, and permitted to set to the rubbery, self-supporting condition of the flocculant products of the invention. The admixture of polyelectrolyte material and polyhydroxy compound may also be extruded to desired shapes, or in any other manner shaped to form products of the required unit dosage concentration. The resulting billets, bars, cylinders or other shape may be mounted on a metal support or encapsulated in other form of supporting member such as a fabric or plastic mesh, and stored for use. Since the flocculant product is highly hydrophilic and/or hygroscopic, it is usually best to store the products in moisture-proof containers or at least out of a moisture bearing environment until they are to be used.

When the flocculant products are suspended or immersed in an aqueous system requiring clarification, the bar or billet will immediately begin to swell through the pores of the supporting member (if an encapsulating mesh) and the flocculating material will begin to slowly disperse from the surface of the swollen product into the aqueous system. A gelatinous core will be observable so long as some of the flocculating material remains. The rate of dissolution of the flocculating material may be controlled by the considerations already mentioned, including the flow rate in the aqueous system, temperature, and similar considerations. As is well known, very minor amounts of polyelectrolyte flocculating material are required for efficient clarification, of the order of about 1–5 parts per million in most aqueous systems.

The encapsulation of the flocculant products in meshwork supporting members permits a plurality of the products to be positioned and spaced apart at optimum treatment points in an aqueous system, thereby increasing the surface area of the product in contact with the aqueous system and placing the flocculating material where it will perform best. If the unit products are in contact with one another, there will be some tendency for them to clump together and thereby somewhat diminish the effective area in contact with the aqueous system.

Any suitable water permeable material may be used to hold or encapsulate the flocculant products, including natural or synthetic fibers such as nylon or cotton, and more permanent cages such as polyethylene mesh or even a rod having a disk on one end in the manner of a candle holder. When the flow rate and dose rate required for treatment of an aqueous system are known, treatment is effected merely by establishing a renewal schedule for inserting the flocculant products. The invention thereby avoids the expense of the mechanical mixers, dispersing apparatus and metering apparatus required in conventional flocculant treatments while at the same time providing a highly convenient mode of treatment on any scale.

The following examples are intended as further illustration of the invention but are not necessarily limitative except as set forth in the claims.

EXAMPLE 1

In a suitable vessel 5 grams of a powdery, anionic, acrylamide flocculant identified as Magnifloc flocculant 837-A, was admixed with 10 milliliters of glycerin with suitable agitation. The mixture solidified into a rubbery, self-supporting mass in about 20 minutes. The resulting cake was encased in nylon mesh, and hung on the side of a vessel containing an industrial sludge so as to immerse the cake in the sludge. The sludge was then stirred to simulate flow conditions in an industrial effluent stream. It was noted that the cake swelled through the nylon mesh, forming a gelatinous mass surrounding the meshwork. The sludge in the vessel was rapidly flocculated by the product, the coagulated material falling to the bottom of the vessel. The foregoing flocculant product was field tested under actual conditions and was found to effectively remove finely dispersed particles in industrial raw water, waste water and plant process waters.

EXAMPLES 2–14

The following table summarizes a number of experiments performed with other combinations of polyelectrolyte flocculating materials and polyhydroxy compounds in forming flocculant products of the invention. In many instances the flocculant products were actually field tested and were shown to provide effective clarification of various types of aqueous systems requiring treatment.

TABLE

| | FLOCCULANT PRODUCTS | | |
|---|---|---|---|
| Ex. | Polyelectrolyte | Polyhydroxy Compound | Time to Form Firm, Rubbery Cake |
| 2. | ¹Magnifloc 560C, 5g. | glycerine, 4ml. | Very rapid |
| 3. | ¹Magnifloc 905N, 5g. | do. | do. |
| 4. | ¹Magnifloc 900W, 5g. | do. | do. |
| 5. | ²Separan 30, 5g. | do. | do. |
| 6. | ³Drewfloc 225, 5g. | do. | do. |
| 7. | ⁴Decolyte 930, 5g. | do. | do. |
| 8. | ¹Magnifloc 837A, 5g. | ⁶Sutro 170, 4ml. | do. |
| 9. | do. | sucrose-saturated aqueous solu., 4ml. | ca. 20 min. |
| 10. | ¹Magnifloc 836A, 10g. | propylene glycol, 5ml. | 1 hr. |
| 11. | do. | ethylene glycol, 5ml. | 5 min. |

TABLE — Continued

FLOCCULANT PRODUCTS

| Ex. | Polyelectrolyte | Polyhydroxy Compound | Time to Form Firm, Rubbery Cake |
|---|---|---|---|
| 12. | [5]Percol 721, 5g. | glycerine, 4ml. | rapid |
| 13. | [5]Percol 721, 5g. | ethylene glycol, 4ml. | do. |
| 14. | [5]Percol 721, 5g. | propylene glycol, 4ml. | do. |

[1]Product of American Cyanamid Company.
[2]Product of Dow Chemical Company.
[3]Product of Drew Chemical Corporation.
[4]Product of Diamond Shamrock Corporation.
[5] Product of Allied Colloids, Inc.
[6]Product of Atlas Chemical Industries, Inc.

EXAMPLE 15

Billets were prepared by forming a mixture wherein the proportions of Magnifloc 837A flocculating material and glycerine were 0.5 lb. and 100 ml., respectively. Before the mixture solidified it was transferred to a plurality of polyvinylchloride pipe molds 8 inches long and 2 inches in diameter. The pipe molds were split lengthwise to permit easy removal of the billets. The resulting solidified, rubbery billets were then each encased in cotton or nylon mesh and field tested at various industrial locations by suspending them at appropriate points in aqueous systems requiring clarification, such as neutralization tanks, overflow or outfall from neutralization tanks, and metal recovery tanks. The flocculant products performed as effectively as conventional flocculating material and no auxiliary dispersing or metering devices were required. For some reason not fully understood the flocculating material disperses more rapidly through cotton mesh than through nylon.

In view of the foregoing description it will be apparent that the invention is not limited to the specific details set forth therein for the purposes of illustration, and that various other modifications are equivalent for the stated and illustrated functions without departing from the spirit and scope of the invention.

What is claimed is:

1. A flocculant product comprising a high molecular weight, water soluble, synthetic organic polyelectrolyte flocculating material treated with a water soluble, organic polyhydroxy compound in an amount sufficient to convert said polyelectrolyte material to a rubbery, self-supporting mass.

2. A flocculant product as in claim 1 in unit dosage form.

3. A flocculant product as in claim 1 wherein said polyhydroxy compound is an alkane polyol containing 2–6 carbon atoms and 2–6 hydroxyl groups, a polyglycerol ester, a monosaccharide, or a polysaccharide.

4. A flocculant product as in claim 1 wherein said polyhydroxy compound is ethylene glycol, propylene glycol, glycerine, sorbitol, a sorbitol derivative, a polyglycerol ester, or sucrose.

5. A flocculant product as in claim 1 wherein said polyhydroxy compound is ethylene glycol, propylene glycol, glycerine, or sucrose.

6. The combination of a flocculant product as in claim 1 and a support member for said product.

7. A combination as in claim 6 wherein said support member is a water-permeable container for said product.

8. A combination as in claim 7 wherein said support member is a meshwork envelope having means for suspending said envelope from an overhead structure.

9. A combination as in claim 8 wherein said meshwork envelope is a fabric material.

10. A process for clarifying an aqueous system, which comprises immersing in said system a flocculant product comprising a high molecular weight, water soluble, synthetic organic polyelectrolyte flocculating material treated with a water soluble organic polyhydroxy compound in an amount sufficient to convert said polyelectrolyte material to a rubbery, self-supporting mass.

11. A process for clarifying an aqueous system as in claim 10, wherein said flocculant product is in unit dosage form.

12. A process for clarifying an aqueous system as in claim 10, wherein said polyhydroxy compound is an alkane polyol containing 2–6 carbon atoms and 2–6 hydroxyl groups, a polyglycerol ester, a monosaccharide, or a polysaccharide.

13. A process for clarifying an aqueous system as in claim 10, wherein said polyhydroxy compound is ethylene glycol, propylene glycol, sorbitol, a sorbitol derivative, a polyglycerol ester, or sucrose.

14. A process for clarifying an aqueous system as in claim 10, wherein said polyhydroxy compound is ethylene glycol, propylene glycol or sucrose.

15. A process for clarifying an aqueous system as in claim 10, wherein said flocculant product is combined with a support member for said product.

16. A process for clarifying an aqueous system as in claim 15, wherein said support member is a water-permeable container for said product.

17. A process for preparing a flocculant product, which comprises treating, in a liquid medium, a high molecular weight, water soluble, synthetic organic polyelectrolyte flocculating material with a water soluble, organic polyhydroxy compound in an amount effective to convert said polyelectrolyte material to a rubbery, self-supporting mass.

18. A process as in claim 17 wherein said mass is produced in dosage unit form.

19. A process as in claim 17 wherein said polyhydroxy compound is an alkane polyol containing 2–6 carbon atoms and 2–6 hydroxyl groups, a polyglycerol ester, a monosaccharide, or a polysaccharide.

20. A process as in claim 17 wherein said polyhydroxy compound is ethylene glycol, propylene glycol, glycerine, sorbitol, a sorbitol derivative, a polyglycerol ester, or sucrose.

21. A process as in claim 17 wherein said liquid medium is provided by dissolving the polyhydroxy compound in a solvent therefor.

* * * * *